US011473683B2

(12) United States Patent
Hayama et al.

(10) Patent No.: US 11,473,683 B2
(45) Date of Patent: Oct. 18, 2022

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/259,138

(22) PCT Filed: Aug. 7, 2019

(86) PCT No.: PCT/JP2019/031069
§ 371 (c)(1),
(2) Date: Jan. 8, 2021

(87) PCT Pub. No.: WO2020/032089
PCT Pub. Date: Feb. 13, 2020

(65) Prior Publication Data
US 2021/0270378 A1 Sep. 2, 2021

(30) Foreign Application Priority Data
Aug. 8, 2018 (JP) .............................. JP2018-149805

(51) Int. Cl.
*F16K 15/00* (2006.01)
*F16K 11/24* (2006.01)
(Continued)

(52) U.S. Cl.
CPC .............. *F16K 11/24* (2013.01); *F16K 11/22* (2013.01); *F04B 27/18* (2013.01)

(58) Field of Classification Search
CPC ...... F16K 11/24; F04B 27/1804; F04B 27/18; F04B 2027/1809; F04B 2027/1868; F04B 2027/1827
See application file for complete search history.

(56) References Cited

U.S. PATENT DOCUMENTS

| 6,010,312 A | 1/2000 | Suitou et al. ............. F04B 1/26 |
| 6,354,811 B1 | 3/2002 | Ota et al. ................... 417/222.2 |

(Continued)

FOREIGN PATENT DOCUMENTS

| EP | 1081378 | 3/2001 | ............. F04B 27/18 |
| EP | 2594794 | 5/2013 | ............. F04B 27/18 |

(Continued)

OTHER PUBLICATIONS

U.S. Appl. No. 17/258,708, filed Jan. 7, 2021, Hayama et al.
(Continued)

*Primary Examiner* — Reinaldo Sanchez-Medina
(74) *Attorney, Agent, or Firm* — Hayes Soloway P.C.

(57) ABSTRACT

A capacity control valve includes a valve housing formed with a discharge port, a suction port, and first and second control ports, a rod arranged in the valve housing and driven by a solenoid, a CS valve 50 configured to control a fluid flow between the first control port and the suction port in accordance with a movement of the rod, and a DC valve configured to control a fluid flow between the second control port and the discharge port in accordance with the movement of the rod. In a non-energization state of the solenoid, the CS valve is closed and the DC valve is opened. As the energization of the solenoid becomes larger, the CS valve transitions from a closed state to an open state, and the DC valve is throttled from an open state and thereafter transitions to the open state.

20 Claims, 10 Drawing Sheets

(51) Int. Cl.
*F16K 11/22* (2006.01)
*F04B 27/18* (2006.01)

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 8,021,124 B2 | 9/2011 | Umemura et al. | 417/222.2 |
| 8,079,827 B2 | 12/2011 | Iwa et al. | 417/222.2 |
| 9,732,874 B2 | 8/2017 | Saeki | F04B 27/1804 |
| 9,777,863 B2 | 10/2017 | Higashidozono | F04B 27/1804 |
| 11,053,933 B2 | 7/2021 | Warren | F04B 27/1804 |
| 11,085,431 B2 | 8/2021 | Fukudome | F04B 27/18 |
| 11,156,301 B2 | 10/2021 | Hayama | F16K 31/0627 |
| 2004/0060604 A1 | 4/2004 | Uemura et al. | 137/595 |
| 2005/0035321 A1* | 2/2005 | Uemura | F16K 27/041 251/129.03 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1* | 1/2015 | Saeki | F04B 27/1804 417/213 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1* | 10/2016 | Sugamura | F04B 27/1804 |
| 2017/0175726 A1 | 6/2017 | Kume | F04B 27/18 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | | |
|---|---|---|---|---|
| EP | 2 784 320 | | 10/2014 | F04B 27/18 |
| EP | 3 431 760 | | 1/2019 | F04B 27/18 |
| JP | 5-306679 | | 11/1993 | F04B 27/08 |
| JP | 6-200875 | | 7/1994 | F04B 27/08 |
| JP | 7-27049 | | 1/1995 | F04B 27/10 |
| JP | 9-144929 | | 6/1997 | F16K 31/06 |
| JP | 2000-345961 | | 12/2000 | F04B 27/14 |
| JP | 2001-73939 | | 3/2001 | F04B 27/14 |
| JP | 2001-132632 | | 5/2001 | F04B 27/14 |
| JP | 2003-42062 | | 2/2003 | F04B 27/14 |
| JP | 2006-52648 | | 2/2006 | F04B 27/14 |
| JP | 2006-307828 | | 11/2006 | F04B 27/14 |
| JP | 2007-247512 | | 9/2007 | F04B 27/14 |
| JP | 2008-14269 | | 1/2008 | F04B 27/14 |
| JP | 2008-202572 | | 9/2008 | F04B 27/14 |
| JP | 4242624 | | 1/2009 | F04B 49/00 |
| JP | 2011-32916 | | 2/2011 | F04B 27/14 |
| JP | 4700048 | | 3/2011 | F04B 49/00 |
| JP | 5167121 | | 12/2012 | F04B 27/14 |
| JP | 2014-118939 | | 6/2014 | F04B 27/14 |
| JP | 5557901 | | 6/2014 | F04B 27/14 |
| JP | 2014-190247 | | 10/2014 | F04B 27/14 |
| JP | 2016-196876 | | 11/2016 | F04B 27/18 |
| JP | 2017-129042 | | 7/2017 | F04B 27/18 |
| JP | 6206274 | | 10/2017 | F04B 27/18 |
| JP | 2017-223348 | | 12/2017 | F16K 11/10 |
| JP | 2018-21646 | | 2/2018 | F16K 31/06 |
| JP | 2018-40385 | | 3/2018 | F16K 31/06 |
| JP | 2018-145877 | | 9/2018 | F04B 39/14 |
| JP | 2019-2384 | | 1/2019 | F04B 27/18 |
| WO | WO 2007/119380 | | 10/2007 | F04B 27/14 |
| WO | WO2011021789 | | 2/2011 | F04B 27/14 |
| WO | WO2011135911 | | 11/2011 | F04B 27/14 |
| WO | WO2013109005 | | 7/2013 | F04B 49/06 |
| WO | WO2013176012 | | 11/2013 | F04B 27/14 |
| WO | WO 2014/091975 | | 6/2014 | F04B 27/14 |
| WO | WO 2014/119594 | | 8/2014 | F04B 27/14 |
| WO | WO2016104390 | | 6/2016 | F16K 31/06 |
| WO | WO 2017/057160 | | 4/2017 | F04B 27/18 |
| WO | WO 2017/159553 | | 9/2017 | F04B 27/18 |
| WO | WO2018207461 | | 11/2018 | F04B 27/18 |
| WO | WO2019167912 | | 9/2019 | F04B 27/18 |

OTHER PUBLICATIONS

U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Whitten Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.

(56) References Cited

OTHER PUBLICATIONS

International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
U.S. Official Action issued in related U.S. Appl. No. 17/299,285, dated Mar. 31, 2022, 11 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
Notice of Allowance issued in related U.S. Appl. No. 17/287,086, dated Feb. 2, 2022, 7 pages.

* cited by examiner

| ENERGIZATION STATE | CURRENT | CS VALVE | DC VALVE |
|---|---|---|---|
| NON-ENERGIZATION | 0 | CLOSED | OPEN |
| ENERGIZATION | 0 ~ MAX | OPENING DEGREE INCREASED | OPENING DEGREE INCREASED AFTER CONTINUOUSLY CLOSED FOR PREDETERMINED PERIOD AFTER OPENING DEGREE DECREASED |
| | MAX | OPEN | CLOSED |

Fig. 8

CAPACITY CONTROL VALVE

TECHNICAL FIELD

The present invention relates to a capacity control valve configured to variably control a working fluid capacity, and for example, relates to a capacity control valve configured to control, according to a pressure, a discharge amount of a variable displacement compressor used for an air-conditioning system of an automobile.

BACKGROUND ART

A variable displacement compressor used for, e.g., an air-conditioning system of an automobile includes, for example, a rotary shaft to be rotatably driven by an engine, a swash plate coupled such that an inclination angle thereof with respect to the rotary shaft is variable, and a compression piston coupled to the swash plate. The inclination angle of the swash plate is changed, and accordingly, a stroke amount of the piston is changed. In this manner, a fluid discharge amount is controlled. Using a capacity control valve to be openably driven by electromagnetic force, the variable displacement compressor can control the internal pressure of a control chamber as necessary to continuously change the inclination angle of the swash plate while utilizing a suction pressure Ps of a suction chamber for sucking fluid, a discharge pressure Pd of a discharge chamber for discharging fluid pressurized by the piston, and a control pressure Pc of the control chamber housing the swash plate (see Patent Citations 1, 2, and 3).

In continuous drive (hereinafter sometimes merely referred to as "in continuous drive") of the variable displacement compressor, energization of the capacity control valve is controlled by a control computer, and the capacity control valve moves a valve body in an axial direction by electromagnetic force generated by a solenoid to perform the normal control of opening/closing a main valve to adjust the control pressure Pc of the control chamber of the variable displacement compressor.

For example, a capacity control valve of Patent Citation 1 is configured such that a control chamber is connected to a discharge chamber through a stationary orifice, and controls a CS valve as a main valve to adjust the pressure of the control chamber with a suction pressure. Moreover, a capacity control valve of Patent Citation 2 is configured such that a control chamber is connected to a suction chamber through a stationary orifice, and controls a DC valve as a main valve to adjust the pressure of the control chamber with a discharge pressure. Further, a capacity control valve of Patent Citation 3 controls a CS valve and a DC valve to adjust the pressure of a control chamber.

In normal control of the capacity control valve, the pressure of the control chamber in the variable displacement compressor is controlled as necessary, and the inclination angle of the swash plate with respect to the rotary shaft is continuously changed. In this manner, the stroke amount of the piston is changed such that the fluid discharge amount for the discharge chamber is controlled, and the air-conditioning system is adjusted to have a desired cooling capacity. Moreover, in a case where the variable displacement compressor is driven with the maximum capacity, the main valve of the capacity control valve is closed such that the pressure of the control chamber decreases, and in this manner, the inclination angle of the swash plate becomes maximum.

CITATION LIST

Patent Literature

Patent Citation 1: JP 2017-129042 A (Page 9, FIG. 2)
Patent Citation 2: Japanese Patent No. 6206274 (Page 8, FIG. 2)
Patent Citation 3: Japanese Patent No. 4242624 (Page 7, FIG. 1)

SUMMARY OF INVENTION

Technical Problem

However, in Patent Citations 1 and 2, the capacity control valve can be configured with a simple configuration. However, the stationary orifice connected to the control chamber of the variable displacement compressor has a constant flow path sectional area. Thus, for adjusting the pressure of the control chamber only by control of the main valve (i.e., the CS valve or the DC valve) in normal control, there is room for improvement in controllability of the control pressure Pc. Moreover, in Patent Citation 3, the CS valve and the DC valve are arranged to enhance controllability. However, Patent Citation 3 fails to describe cooperation of the CS valve and the DC valve, and a favorable control efficiency in normal control cannot be always provided.

The present invention has been made in view of these problems, and is intended to provide a capacity control valve with a favorable control efficiency in normal control.

Solution to Problem

For solving the above-described problems, a capacity control valve according to a first aspect of the present invention is a capacity control valve for controlling a flow rate by energization of a solenoid, including: a valve housing formed with a discharge port through which discharge fluid with a discharge pressure passes, a suction port through which suction fluid with a suction pressure passes, and first and second control ports through which control fluid with a control pressure passes; a rod arranged in the valve housing and driven by the solenoid; a CS valve configured to control a fluid flow between the first control port and the suction port in accordance with a movement of the rod; and a DC valve configured to control a fluid flow between the second control port and the discharge port in accordance with the movement of the rod, wherein in a non-energization state of the solenoid, the CS valve is closed and the DC valve is opened, wherein as the energization of the solenoid becomes larger, the CS valve transitions from a closed state to an open state, and the DC valve is throttled from an open state and thereafter transitions to the open state, and wherein in a maximum current state of the solenoid, the CS valve is opened and the DC valve is opened. According to the aforesaid feature of the first aspect of the present invention, the flow rate is controlled by cooperation of the CS valve and the DC valve, and therefore, the control pressure can be controlled with a favorable efficiency. Moreover, the CS valve and the DC valve transition in opposite directions in a low energization current range, only a CS valve opening degree increases in an intermediate current range, and the CS valve and the DC valve transition in the same direction in a high current range. The control pressure is controlled based on a difference between the amount of adjustment of the control pressure by the CS valve and the amount of adjustment of the control pressure by the DC valve. Thus, the control pressure can be finely controlled in association with a current value. Particularly, as energization current increases, the control pressure can be more finely controlled in association with the current value.

It may be preferable that a state in which the DC valve is throttled in the energization of the solenoid is a closed state. According to this preferable configuration, a control range according to the energization current for the solenoid is broader in the CS valve than in the DC valve. That is, the CS valve is main, and the DC valve is auxiliary. Thus, a favorable control efficiency is provided.

It may be preferable that the DC valve has a spool valve structure, and includes a land portion of the rod and a DC valve seat provided at the inner periphery of the valve housing. According to this preferable configuration, the DC valve can be simply configured.

It may be preferable that the rod is arranged at the inner periphery of the valve housing to partition the suction port and the discharge port. According to this preferable configuration, the capacity control valve can be simply configured.

It may be preferable that the CS valve includes a pressure-sensitive body and a Cs valve seat, the pressure-sensitive body being arranged in a pressure-sensitive chamber formed with the first control port and configured to bias the rod, the CS valve seat being provided at the valve housing. According to this preferable configuration, a structure in which reactive force provided to the rod according to the suction pressure is increased/decreased is made, and controllability of the control pressure is enhanced.

It may be preferable that a spring configured to provide biasing force in an axial direction is arranged between the pressure-sensitive body and the rod. According to this preferable configuration, the spring can deformably move in the axial direction. Thus, even if an axial deformable amount of the pressure-sensitive body is small, the DC valve can be reliably operated.

It may be preferable that the discharge port, the second control port, the suction port, and the first control port or the second control port, the discharge port, the suction port, and the first control port are arranged in description order from a side of the solenoid. According to this preferable configuration, the valve housing can be simply configured.

A capacity control valve according to a second aspect of the present invention is a capacity control valve for controlling a flow rate by energization of a solenoid, including: a valve housing formed with a discharge port through which discharge fluid with a discharge pressure passes, a suction port through which suction fluid with a suction pressure passes, and first and second control ports through which control fluid with a control pressure passes; a rod arranged in the valve housing, driven by the solenoid, the rod forming a spool valve structure of a DC valve configured to control a fluid flow between the second control port and the discharge port by a land portion arranged at an outer periphery; and a pressure-sensitive body forming a CS valve configured to control a fluid flow between the first control port and the suction port in accordance with a movement of the rod. According to the feature of the second aspect of the present invention, the flow rate is controlled by cooperation of the CS valve and the DC valve, and therefore, the control pressure can be controlled with a favorable efficiency.

BRIEF DESCRIPTION OF DRAWINGS

FIG. 8 is a table for describing the energization state of the capacity control valve of the embodiment and the opened/closed states of the CS valve and the DC valve.

DESCRIPTION OF EMBODIMENTS

Hereinafter, a mode for carrying out a capacity control valve according to the present invention will be described based on an embodiment.

Embodiment

A capacity control valve according to an embodiment will be described with reference to FIGS. 1 to 8. Hereinafter, right and left sides as viewed from a front side of FIG. 2 will be described as right and left sides of the capacity control valve.

The capacity control valve V of the present invention is incorporated into a variable displacement compressor M used for, e.g., an air-conditioning system of an automobile. The capacity control valve V variably controls the pressure of working fluid (hereinafter merely referred to as "fluid") as refrigerant, thereby controlling a discharge amount of the variable displacement compressor M and adjusting the air-conditioning system to have a desired cooling capacity.

Figure 1:
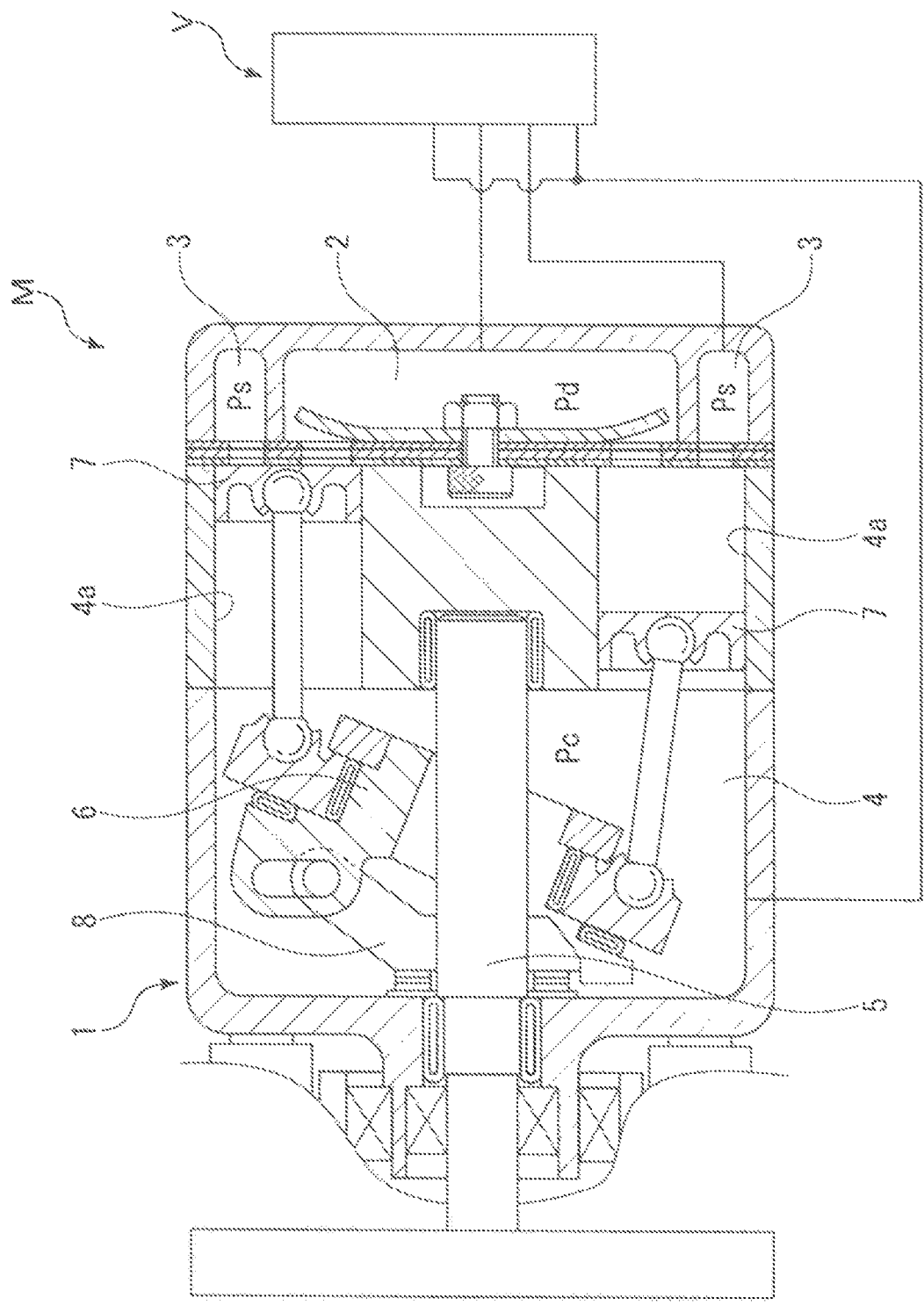
FIG. 1 is a schematic configuration view illustrating a swash plate type variable displacement compressor incorporating a capacity control valve of an embodiment according to the present invention.

First, the variable displacement compressor M will be described. As illustrated in FIG. 1, the variable displacement compressor M has a casing 1 including a discharge chamber 2, a suction chamber 3, a control chamber 4, and multiple cylinders 4a.

Moreover, the variable displacement compressor M includes a rotary shaft 5 to be rotatably driven by a not-shown engine placed outside the casing 1, a swash plate 6 coupled in an eccentric state with respect to the rotary shaft 5 by a hinge mechanism 8 in the control chamber 4, and multiple pistons 7 coupled to the swash plate 6 and each reciprocatably fitted in the cylinders 4a. Using the capacity control valve V to be openably driven by electromagnetic force, the variable displacement compressor M controls the internal pressure of the control chamber 4 as necessary to continuously change an inclination angle of the swash plate 6 while utilizing a suction pressure Ps of the suction chamber 3 for sucking the fluid, a discharge pressure Pd of the discharge chamber 2 for discharging the fluid pressurized by the piston 7, and a control pressure Pc of the control chamber 4 housing the swash plate 6. In this manner, the variable displacement compressor M changes a stroke amount of the piston 7 to control the fluid discharge amount. Note that for the sake of convenience in description, the capacity control valve V incorporated into the variable displacement compressor M is not shown in FIG. 1.

Specifically, as the control pressure Pc in the control chamber 4 increases, the inclination angle of the swash plate 6 with respect to the rotary shaft 5 decreases and the stroke amount of the piston 7 decreases. However, when such a pressure reaches a pressure of equal to or higher than a certain pressure, the swash plate 6 is brought into a state in which the swash plate 6 is substantially perpendicular to the rotary shaft 5, i.e., a state in which the swash plate 6 is slightly inclined with respect to a direction perpendicular to the rotary shaft 5. In this state, the stroke amount of the piston 7 is minimum, and pressurization of the fluid in the cylinder 4a by the piston 7 is minimum. Accordingly, the amount of fluid discharged to the discharge chamber 2 decreases, and the cooling capacity of the air-conditioning system becomes minimum. On the other hand, as the control pressure Pc in the control chamber 4 decreases, the inclination angle of the swash plate 6 with respect to the rotary shaft 5 increases and the stroke amount of the piston 7 increases. However, when such a pressure reaches a pressure of equal to or lower than a certain pressure, the swash plate 6 is at the maximum inclination angle with respect to the rotary shaft 5. In this state, the stroke amount of the piston 7 is maximum, and pressurization of the fluid in the cylinder 4a by the piston 7 is maximum. Accordingly, the amount of fluid discharged to the discharge chamber 2 increases, and the cooling capacity of the air-conditioning system becomes maximum.

Figure 2:
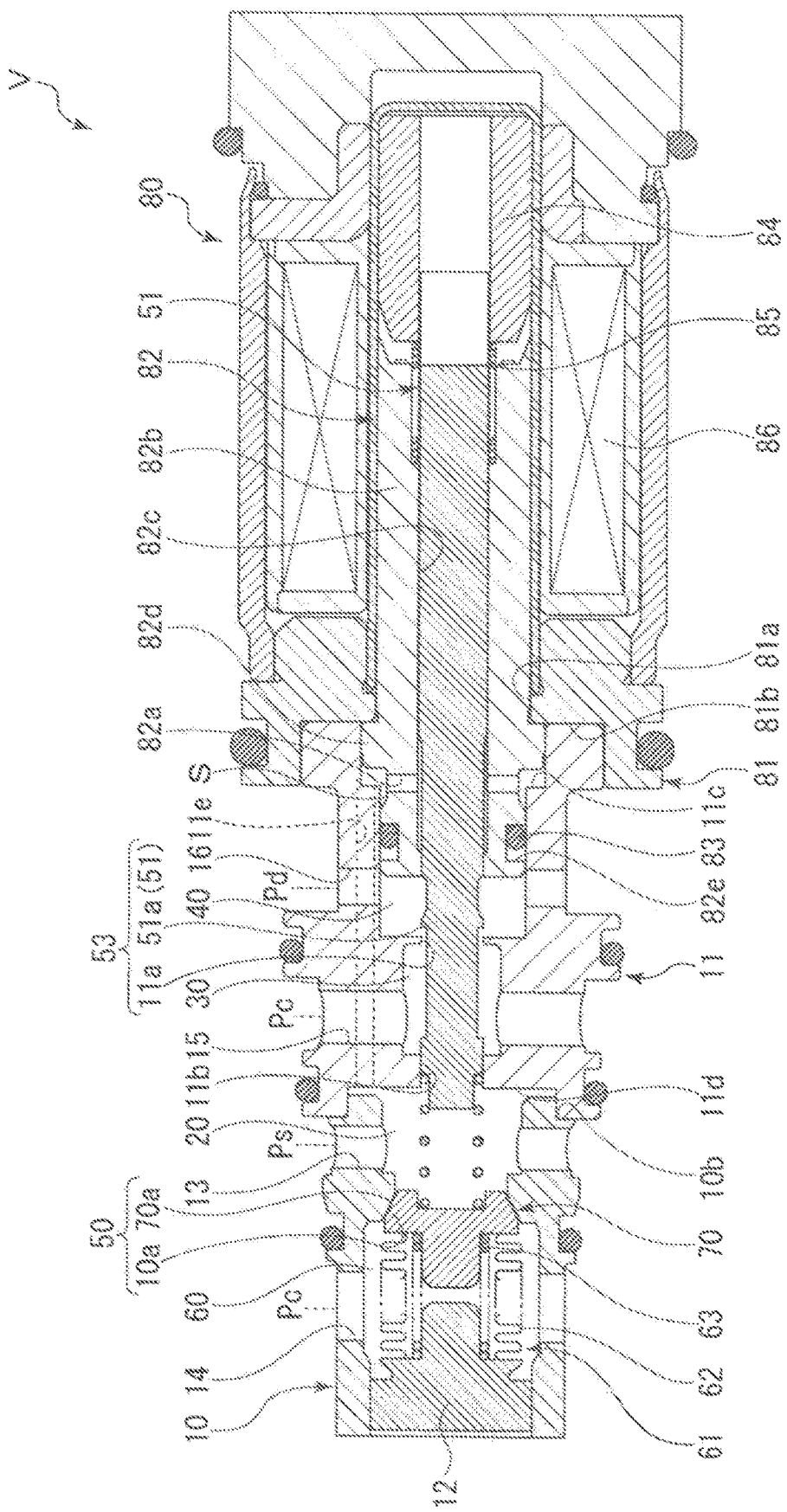
FIG. 2 is a sectional view illustrating a state in which a DC valve is opened and a CS valve is closed in a non-energization state of the capacity control valve of the embodiment.

As illustrated in FIG. 2, the capacity control valve V incorporated into the variable displacement compressor M adjusts current energizing a coil 86 forming a solenoid 80, controls opening/closing of a CS valve 50 and a DC valve 53 in the capacity control valve V, and controls the fluid flowing into the control chamber 4 or flowing out of the control chamber 4. In this manner, the capacity control valve V variably controls the control pressure Pc in the control chamber 4. Note that upon normal control of the capacity control valve V, the discharge pressure Pd is a higher pressure than the control pressure Pc, and the control pressure Pc is a high pressure of equal to or higher than the suction pressure Ps.

In the present embodiment, the CS valve 50 includes an adaptor 70 forming a pressure-sensitive body 61, and a CS valve seat 10a formed at an inner peripheral surface of a first valve housing 10 as a valve housing. A tapered end portion 70a formed on the right side of the adaptor 70 in an axial direction contacts or separates from the CS valve seat 10a, and in this manner, the CS valve 50 is opened/closed. The DC valve 53 has a spool valve structure, and includes a rod 51 and a DC valve seat 11a formed at an inner peripheral surface of a second valve housing 11 as the valve housing. A first land portion 51a as a land portion of the rod 51 contacts or separates from the DC valve seat 11a, and in this manner, the DC valve 53 is opened/closed.

Subsequently, the structure of the capacity control valve V will be described. As illustrated in FIG. 2, the capacity control valve V mainly includes the first valve housing 10 and the second valve housing 11 made of a metal material or a resin material, the rod 51 arranged reciprocatably in the axial direction inside the first valve housing 10 and the second valve housing 11, the pressure-sensitive body 61 configured to provide rightward biasing force in the axial direction to the rod 51 according to the suction pressure Ps in a first valve chamber 20, and the solenoid 80 connected to the second valve housing 11 and providing drive force to the rod 51.

As illustrated in FIG. 2, the solenoid 80 mainly includes a casing 81 having an opening 81a opening leftward in the axial direction, a substantially cylindrical stationary iron core 82 inserted into the opening 81a of the casing 81 from the left in the axial direction and fixed to an inner diameter side of the casing 81, the rod 51 inserted into the stationary iron core 82 and arranged reciprocatably in the axial direction, a movable iron core 84 fixed to a right end portion of the rod 51 in the axial direction, a coil spring 85 provided between the stationary iron core 82 and the movable iron core 84 and biasing the movable iron core 84 rightward in the axial direction, and the excitation coil 86 wound around the outside of the stationary iron core 82 through a bobbin.

At the casing 81, a recessed portion 81b recessed rightward in the axial direction on the inner diameter side at a left end in the axial direction is formed. A right end portion of the second valve housing 11 in the axial direction is substantially hermetically inserted/fixed into the recessed portion 81b.

The stationary iron core 82 is made of a rigid body as a magnetic material such as iron or silicon steel, and includes a cylindrical portion 82b extending in the axial direction and formed with an insertion hole 82c into which a right portion of the rod 51 in the axial direction is inserted and an annular flange portion 82d extending in an outer diameter direction from an outer peripheral surface of a left end portion of the cylindrical portion 82b in the axial direction. On the left side in the axial direction with respect to the flange portion 82d, an annular recessed portion 82e recessed in an inner diameter direction from an outer peripheral surface of the cylindrical portion 82b is formed. Note that an O-ring 83 is attached to the annular recessed portion 82e, and therefore, the stationary iron core 82 and the second valve housing 11 are connected and fixed to each other in a hermetic state.

Moreover, in a state in which a right end surface of the flange portion 82d in the axial direction contacts a bottom surface of the recessed portion 81b of the casing 81, the stationary iron core 82 is inserted/fixed into a recessed portion 11c recessed leftward in the axial direction on the inner diameter side at a right end, which is inserted/fixed into the recessed portion 81b of the casing 81, of the second valve housing 11 in the axial direction.

Further, in a state in which the stationary iron core 82 and the second valve housing 11 are attached to the casing 81, an annular space S is formed between a left end surface of the flange portion 82d of the stationary iron core 82 in the axial direction and the recessed portion 11c of the second valve housing 11. Note that the space S is communicated with the insertion hole 82c inside the stationary iron core 82 through a through-hole 82a extending in a radial direction between the flange portion 82d and the annular recessed portion 82e at the cylindrical portion 82b of the stationary iron core 82.

As illustrated in FIG. 2, a Ps port 13 as a suction port communicated with the suction chamber 3 of the variable displacement compressor M and a first Pc port 14 as a first control port communicated with the control chamber 4 of the variable displacement compressor M are formed at the first valve housing 10. Moreover, a second Pc port 15 as a second control port communicated with the control chamber 4 of the variable displacement compressor M and a Pd port 16 as a discharge port communicated with the discharge chamber 2 of the variable displacement compressor M are formed at the second valve housing 11. Note that these ports are, from a solenoid 80 side, formed in the order of the Pd port 16, the second Pc port 15, the Ps port 13, and the first Pc port 14.

Moreover, an outer diameter portion at a right end of the first valve housing 10 in the axial direction is recessed leftward in the axial direction to form a step portion 10b, and a left end portion of the second valve housing 11 in the axial direction is fitted onto such an outer diameter portion from the right in the axial direction such that the first valve housing 10 is connected and fixed in a hermetic state. Further, a partition adjustment member 12 is substantially hermetically press-fitted in a left end portion of the first valve housing 10 in the axial direction, and therefore, the first valve housing 10 is in a substantially cylindrical shape with a bottom. Note that the partition adjustment member 12 adjusts an installation position of the first valve housing 10 in the axial direction so that the biasing force of the pressure-sensitive body 61 can be adjusted.

The rod 51 is arranged reciprocatably in the axial direction in the first valve housing 10 and the second valve housing 11, and at part of the inner peripheral surface of the second valve housing 11, a small-diameter guide surface 11b is formed so that an outer peripheral surface of a second land portion 51b (see FIGS. 3 to 6) of the rod 51 can slidably contact the guide surface 11b in a substantially hermetic state.

Moreover, in the first valve housing 10, the first valve chamber 20 which is communicated with the Ps port 13 and in which a left end portion of the rod 51 in the axial direction is arranged and a pressure-sensitive chamber 60 which is communicated with the first Pc port 14 and in which the pressure-sensitive body 61 is arranged are formed. Further, in the second valve housing 11, a second valve chamber 30 which is communicated with the second Pc port 15 and in which the second land portion 51b (see FIGS. 3 to 6) of the rod 51 is arranged and a third valve chamber 40 which is communicated with the Pd port 16, in which the first land portion 51a of the rod 51 is arranged, and which is arranged on the solenoid 80 side of the second valve housing 11 are formed.

Note that the first valve chamber 20 is defined by an outer peripheral surface at a left end portion of the rod 51 in the axial direction, an inner peripheral surface on the right side in the axial direction with respect to the CS valve seat 10a of the first valve housing 10, and an inner surface of a recessed portion 11d recessed rightward in the axial direction on the inner diameter side at a left end of the second valve housing 11 in the axial direction. Further, in a state in which the first valve housing 10 and the second valve housing 11 are connected and fixed to each other, the first valve chamber 20 and the second valve chamber 30 are partitioned by the second land portion 51b of the rod 51. Moreover, the second valve chamber 30 and the third valve chamber 40 are defined by an outer peripheral surface on the right side in the axial direction with respect to the second land portion 51b of the rod 51 and the inner peripheral surface of the second valve housing 11. When the DC valve 53 is closed, the second valve chamber 30 and the third valve chamber 40 are separated from each other. When the DC valve 53 is opened, the second valve chamber 30 and the third valve chamber 40 are communicated with each other.

Further, a through-hole 11e extending in the axial direction from the recessed portion 11c on the right side in the axial direction to the recessed portion 11d on the left side in the axial direction is formed at the second valve housing 11, and the first valve chamber 20 and the space S are communicated with each other through the through-hole 11e. Thus, the suction pressure Ps of the suction chamber 3 is introduced into the right side in the axial direction as the back side of the movable iron core 84 forming the solenoid 80 through the Ps port 13, the first valve chamber 20, the through-hole 11e of the second valve housing 11, the space S, and the through-hole 82a and the insertion hole 82c of the stationary iron core 82, and accordingly, pressure on both sides of the rod 51 in the axial direction is balanced.

As illustrated in FIG. 2, the pressure-sensitive body 61 mainly includes a bellows core 62 having a built-in coil spring 63, and the adaptor 70 provided at a right end of the bellows core 62 in the axial direction. A left end of the bellows core 62 in the axial direction is fixed to the partition adjustment member 12.

Moreover, the pressure-sensitive body 61 is arranged in the pressure-sensitive chamber 60, and by the biasing force of moving the adaptor 70 rightward in the axial direction by the coil spring 63 and the bellows core 62, the tapered end portion 70a of the adaptor 70 sits on the CS valve seat 10a of the first valve housing 10.

As illustrated in FIGS. 3 to 6, the rod 51 mainly includes a large-diameter portion 51c fixed to the movable iron core 84 (see FIG. 2) at a right end portion in the axial direction, a first small-diameter portion 51d formed with a smaller diameter than that of the large-diameter portion 51c on the left side of the large-diameter portion 51c in the axial direction, and a second small-diameter portion 51e formed with a smaller diameter than that of the first small-diameter portion 51d on the left side of the first small-diameter portion 51d in the axial direction. At the second small-diameter portion 51e, the circular ring-shaped first land portion 51a and the circular ring-shaped second land portion 51b extending in the outer diameter direction are formed. A portion between the first land portion 51a and the second land portion 51b in the axial direction is in a shape recessed in an annular shape in the inner diameter direction, and a portion on the left side in the axial direction with respect to the second land portion 51b is in a shape with a small diameter.

The first land portion 51a is in a trapezoidal shape as viewed in the section such that a side portion extending in the inner diameter direction from the left side of an outer peripheral portion 51h in the axial direction is perpendicular to the axial direction of the rod 51 and a side portion extending in the inner diameter direction from the right side of the outer peripheral portion 51h in the axial direction is formed in a tapered shape with respect to the axial direction of the rod 51. The length of the outer peripheral portion 51h in the axial direction is set substantially equal to the length of the DC valve seat 11a in the axial direction, the DC valve seat 11a being forming at the inner peripheral surface of the second valve housing 11.

Moreover, a left end 51f of the rod 51 in the axial direction, i.e., the left end 51f of the second small-diameter portion 51e in the axial direction, is separated from a bottom surface of a recessed portion 70b recessed leftward in the axial direction on the inner diameter side at a right end of the adaptor 70 in the axial direction. A coil spring 54 as a spring is fitted onto a left end portion of the second small-diameter portion 51e in the axial direction. Thus, in an energization state of the capacity control valve V, the leftward drive force of the solenoid 80 in the axial direction acts on the pressure-sensitive body 61, and rightward reactive force in the axial direction is received from the pressure-sensitive body 61.

Further, a left end of the coil spring 54 in the axial direction contacts the bottom surface of the recessed portion 70b of the adaptor 70, and a right end of the coil spring 54 in the axial direction contacts a side portion 51g of the second land portion 51b of the rod 51 on the left side in the axial direction.

Subsequently, operation of the capacity control valve V and operation of opening/closing mechanisms of the CS valve 50 and the DC valve 53 by movement of the rod 51 in the axial direction will be described.

Figure 3:
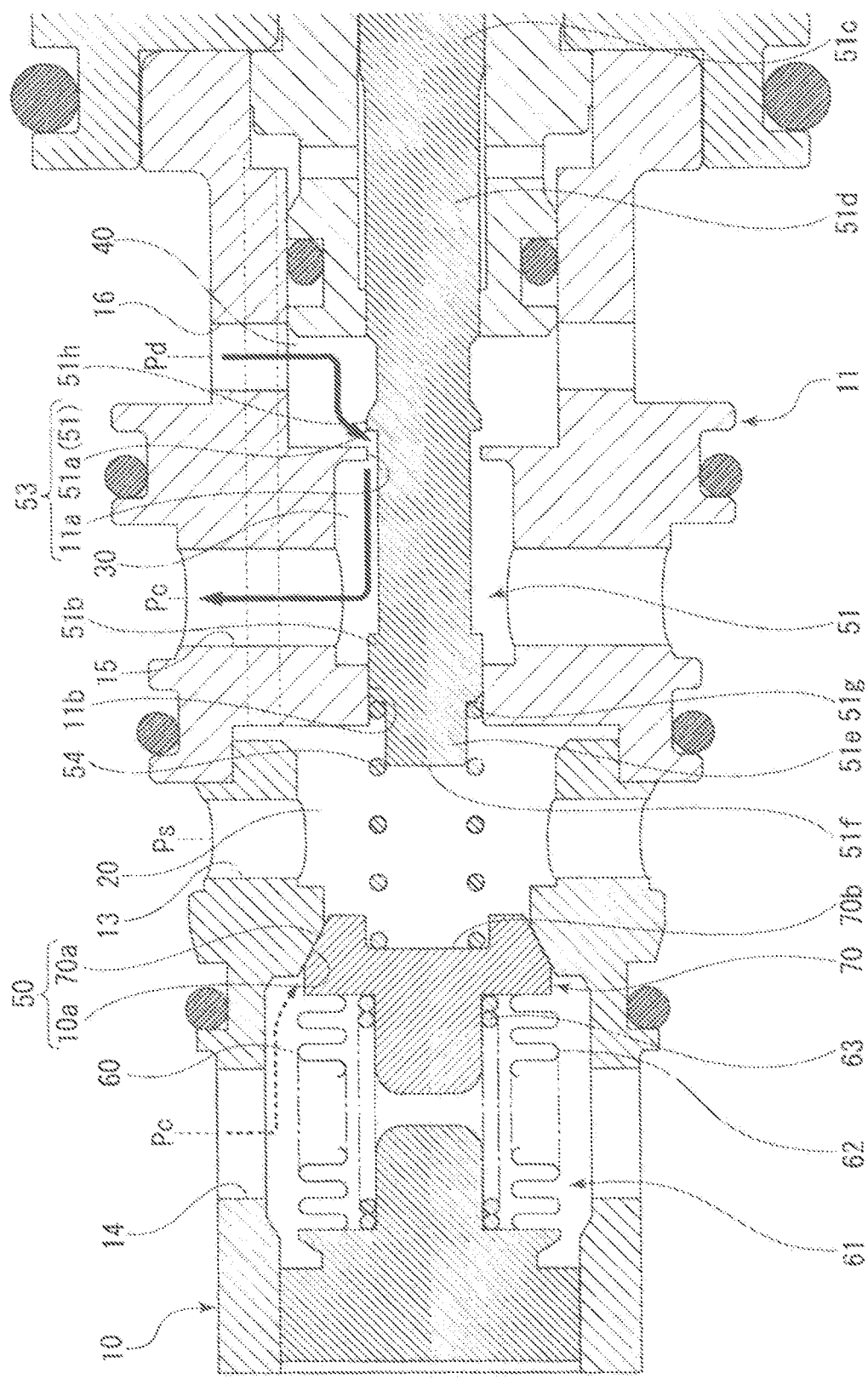
FIG. 3 is an enlarged sectional view of FIG. 2 illustrating a state in which the DC valve is opened and the CS valve is closed in the non-energization state of the capacity control valve of the embodiment.

First, a non-energization state of the capacity control valve V will be described. As illustrated in FIGS. 2 and 3, in the non-energization state of the capacity control valve V, biasing force $F_{sp1}$ of the coil spring 85 forming the solenoid 80, the biasing force $F_{be1}$ of the pressure-sensitive body 61 (formed by the bellows core 62 and the coil spring 63), and biasing force $F_{sp2}$ of the coil spring 54 arranged between the pressure-sensitive body 61 and the rod 51 act rightward in the axial direction on the rod 51. That is, force $F_{rod}=F_{sp1}+F_{be1}+F_{sp2}$ acts on the rod 51, supposing that the rightward direction is a positive direction. Thus, the tapered end portion 70a of the adaptor 70 sits on the CS valve seat 10a of the first valve housing 10, the CS valve 50 is closed (e.g., fully closed), the first land portion 51a of the rod 51 is separated rightward in the axial direction from the DC valve seat 11a of the second valve housing 11, and the DC valve 53 is opened. Moreover, in this state, the degree of elongation of the coil spring 54 is maximum.

As described above, in a non-energization state of the solenoid 80, the CS valve 50 is closed (e.g., fully closed), and the DC valve 53 is opened. In a state in which the CS valve 50 is closed, the opening area of the DC valve 53, i.e., the degree of opening of the DC valve 53, is maximum (see FIGS. 7 and 8).

Figure 4:
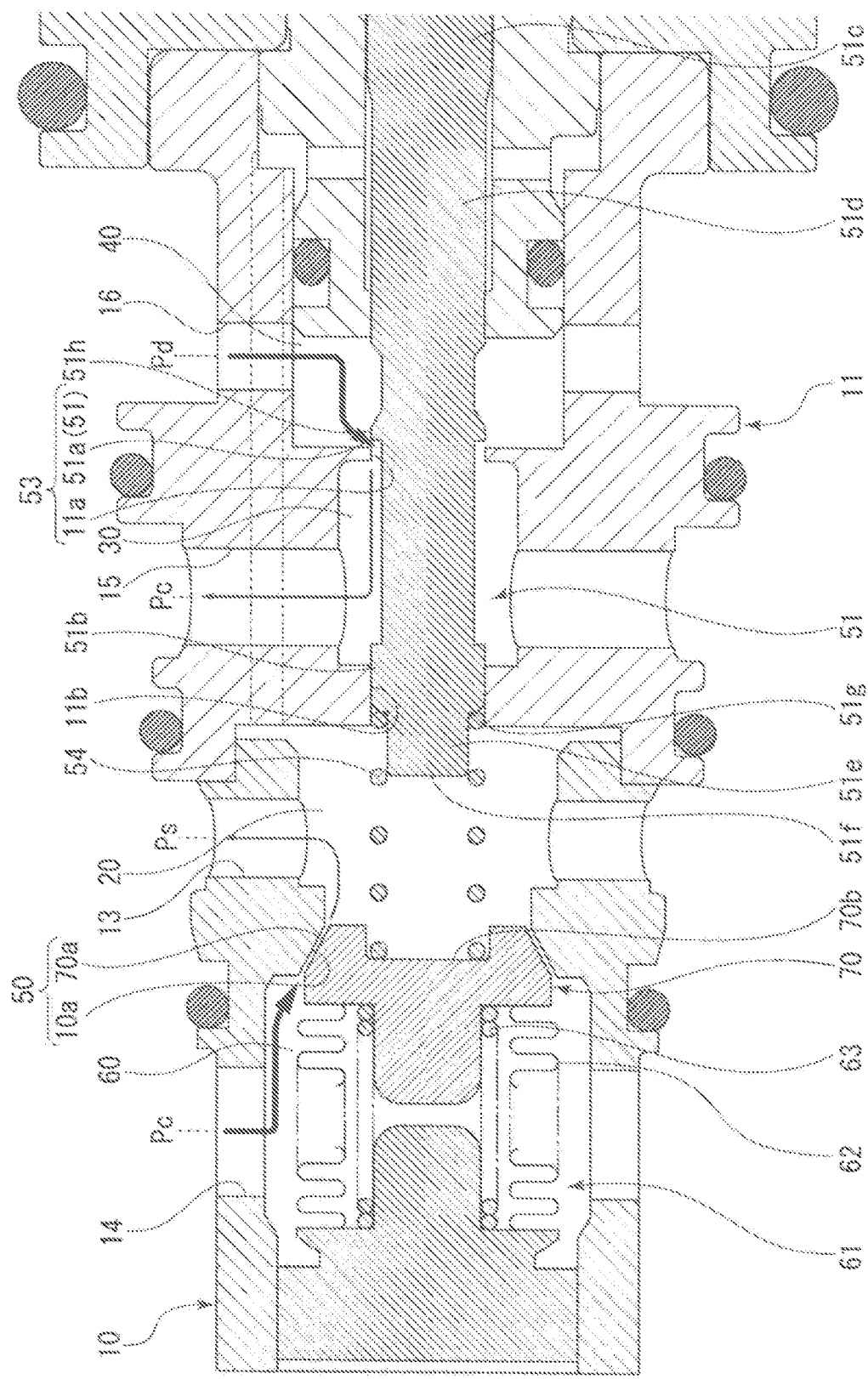
FIG. 4 is a sectional view illustrating a state in which the DC valve transitions from an open state to a closed state and the CS valve transitions from a closed state to an open state in an energization state (e.g., corresponding to a low current range) of the capacity control valve of the embodiment.

Next, the energization state of the capacity control valve V will be described. As illustrated in FIG. 4, when electromagnetic force $F_{sol}1$ generated by application of current (e.g., a current value in a low current range) to the solenoid 80 exceeds the force $F_{rod}$ in a normal energization state (e.g., corresponding to a normal control, in so-called duty control) of the capacity control valve V, the movable iron core 84 is attracted to a stationary iron core 82 side, i.e., the left side in the axial direction, against the biasing force of the coil spring 85 forming the solenoid 80, the rod 51 fixed to the movable iron core 84 moves leftward in the axial direction, and the pressure-sensitive body 61 is pressed and contracts leftward in the axial direction through the coil spring 54. Thus, the tapered end portion 70a of the adaptor 70 is separated from the CS valve seat 10a of the first valve housing 10, and the CS valve 50 transitions from a closed state (e.g., a fully-closed state) to an open state. Moreover, the first land portion 51a of the rod 51 approaches from the right side of the DC valve seat 11a of the second valve housing 11 in the axial direction, and therefore, the degree of opening of the DC valve 53 is reduced (see FIGS. 7 and 8).

Figure 5:
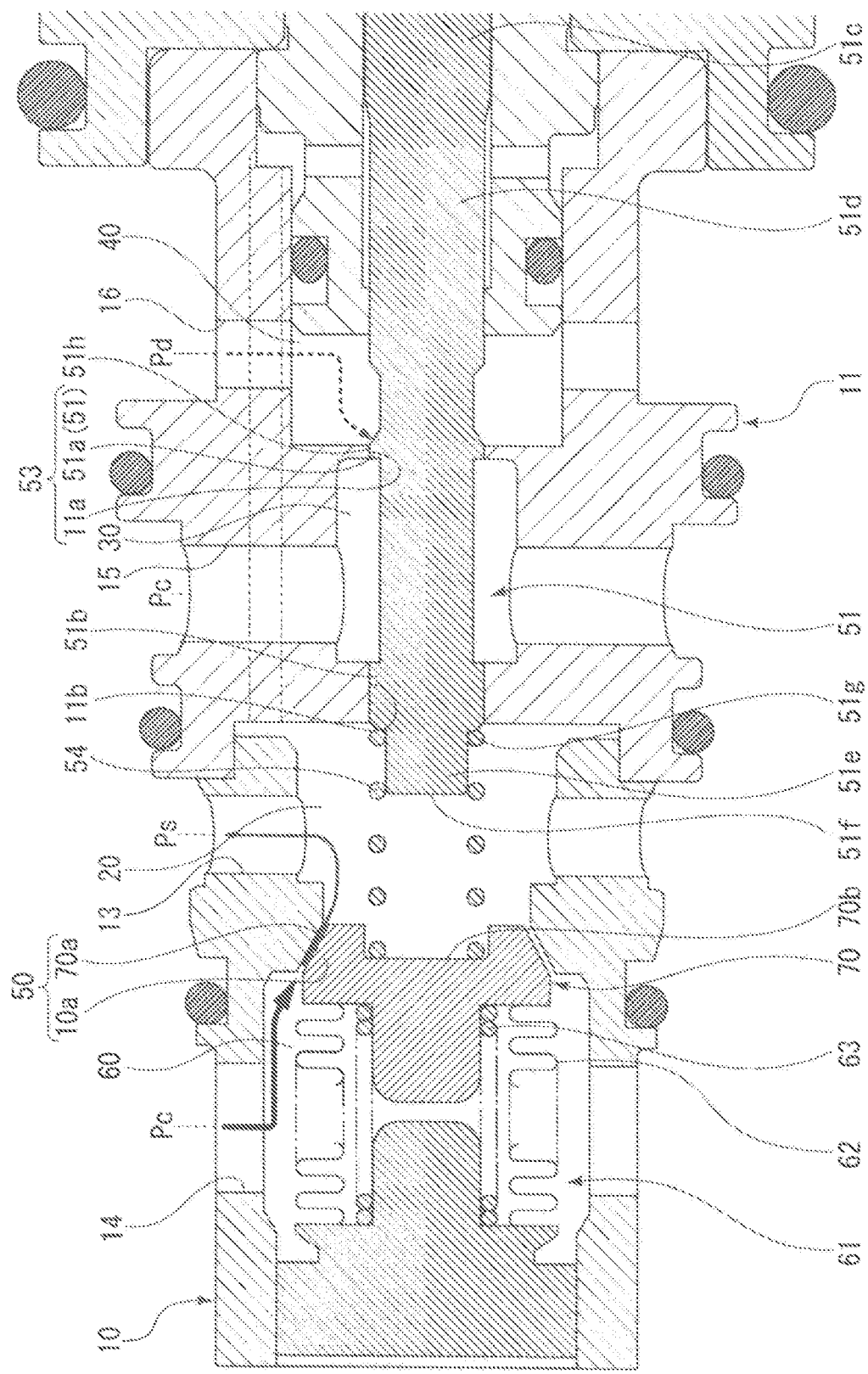
FIG. 5 is a sectional view illustrating a state in which the DC valve is closed and the CS valve is opened in the energization state (e.g., corresponding an intermediate current range) of the capacity control valve of the embodiment.
Figure 6:
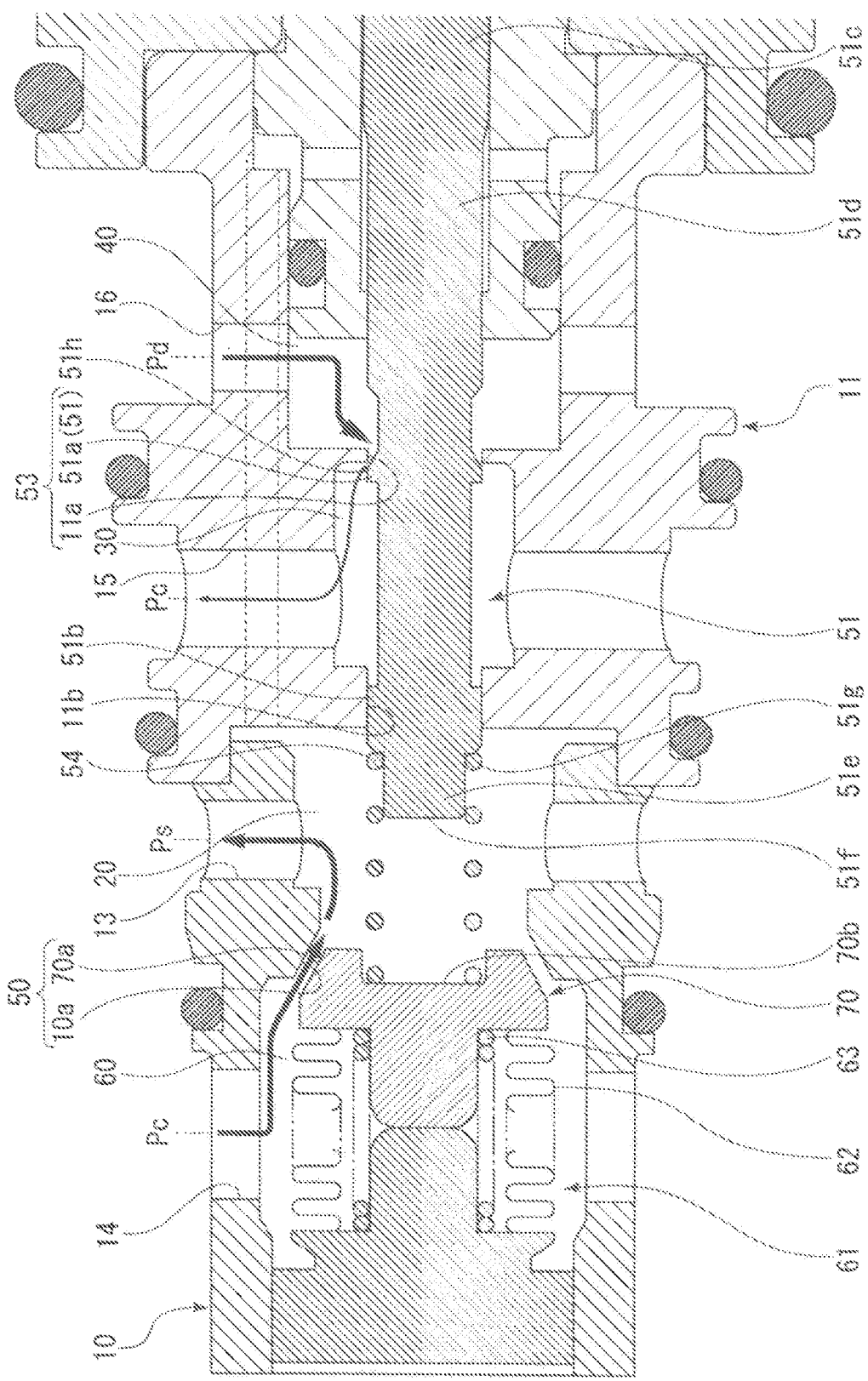
FIG. 6 is a sectional view illustrating a state in which the DC valve transitions from the closed state to the open state and the CS valve is opened in the energization state (eg.g., corresponding to a high current range) of the capacity control valve of the embodiment.

As illustrated in FIG. 5, when energization current for the solenoid 80 is increased to a current value in an intermediate current range and the CS valve 50 is opened to a predetermined valve opening degree, i.e., the degree of opening of the CS valve 50 is increased, the first land portion 51a of the rod 51 and the DC valve seat 11a of the second valve housing 11 overlap with each other as viewed in the radial direction. Accordingly, the outer peripheral portion 51h of the first land portion 51a of the rod 51 sits on the DC valve seat 11a of the second valve housing 11, and the DC valve 53 transitions from an open state, i.e., a state in which the valve opening degree is reduced, to a closed state (e.g., a fully-closed state) (see FIGS. 7 and 8). In this state, the coil spring 54 contracts in the axial direction.

Figure 7:
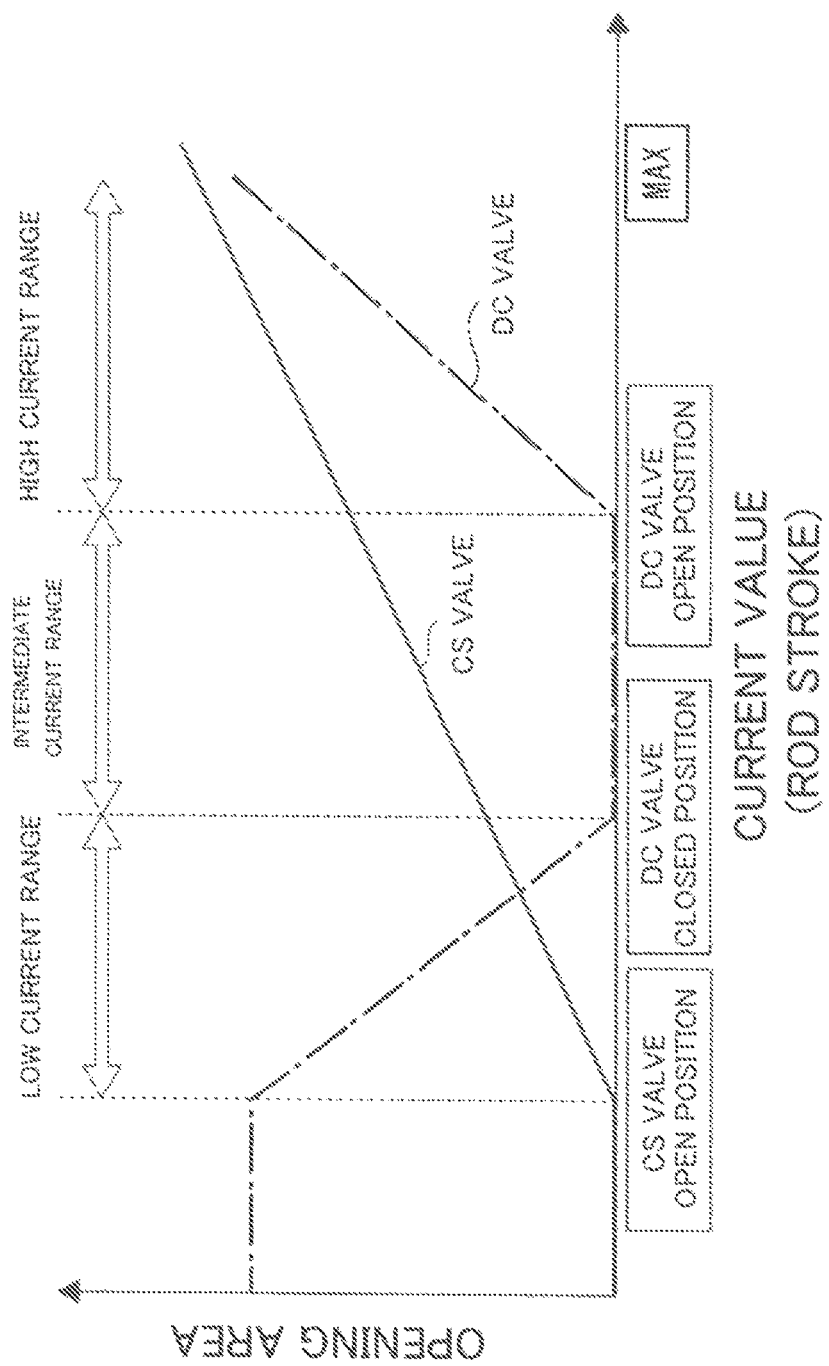
FIG. 7 is a graph for describing the opened/closed state of the DC valve and the opened/closed state of the CS valve in association with energization current (e.g., corresponding to a rod stroke) in the capacity control valve of the embodiment. Note that the energization current (corresponding to the stroke) of the horizontal axis is shown in terms of the direction (i.e., a direction from the left to the right in FIG. 2) of moving a rod upon current application to a solenoid.

Further, when the energization current for the solenoid 80 is increased to a current value in a high current range and the CS valve 50 is opened to equal to or higher than the predetermined valve opening degree, i.e., the degree of opening of the CS valve 50 is increased, the first land portion 51a of the rod 51 is separated leftward in the axial direction from the DC valve seat 11a of the second valve housing 11, and the DC valve 53 transitions from the closed state (e.g., the fully-closed state) to the open state (see FIGS. 7 and 8).

According to such a configuration, a refrigerant flow rate is controlled by cooperation of the CS valve 50 and the DC valve 53 in the normal control of the capacity control valve V, and therefore, the control pressure Pc can be efficiently controlled. Further, as the energization current (corresponding to the current value) for the solenoid 80 increases, i.e., the stroke of the rod 51 increases, the CS valve 50 transitions from the closed state (e.g., the fully-closed state) to the open state. Moreover, the degree of opening of the DC valve 53 is reduced from that in the open state, and the DC valve 53 is closed (e.g., fully closed). Thereafter, the DC valve 53 transitions to the open state (see FIG. 7). That is, the degree of opening of the CS valve 50 and the degree of opening of the DC valve 53 in association with an increase in the energization current for the solenoid 80 transition in opposite directions in the low current range, only the CS valve opening degree increases in the intermediate current range, and the degree of opening of the CS valve 50 and the degree of opening of the DC valve 53 transition in the same direction in the high current range. The control pressure Pc is controlled based on a difference between the amount of adjustment of the control pressure Pc by the CS valve 50 and the amount of adjustment of the control pressure Pc by the DC valve 53. Thus, the control pressure Pc can be finely controlled in association with the current value. Particularly, as the energization current increases, the control pressure Pc can be more finely controlled in association with the current value.

Moreover, it is configured such that when the energization current for the solenoid 80 is the current value in the intermediate current range, the DC valve 53 is closed (e.g., fully closed). Thus, a control range of the control pressure Pc by the CS valve 50 in association with the energization current for the solenoid 80 is broader than a control range of the control pressure Pc by the DC valve 53. That is, control of the refrigerant flow rate from the first Pc port 14 to the Ps port 13 by the CS valve 50 with a smaller required refrigerant flow rate is main, and control of the refrigerant flow rate from the Pd port 16 to the second Pc port 15 by the DC valve 53 with a greater required refrigerant flow rate is auxiliary. Thus, an internal circulating refrigerant flow rate in the normal control of the capacity control valve V can be reduced, and a favorable efficiency for controlling the control pressure Pc is provided. Consequently, an operation efficiency of the variable displacement compressor M can be enhanced.

Further, the DC valve 53 has the spool valve structure formed by the first land portion 51a of the rod 51 and the DC valve seat 11a provided at the inner periphery of the second valve housing 11. Thus, the rod 51 strokes a predetermined amount or more in the axial direction, and accordingly, the DC valve 53 is brought into the closed state. Consequently, the DC valve 53 can be reliably closed. Further, when the energization current for the solenoid 80 is, for example, the current value in the intermediate current range, even if the rod 51 slightly moves in the axial direction due to, e.g., disturbance such as vibration, the DC valve 53 is maintained in the closed state. Thus, the capacity control valve V has resistance to the disturbance, and exhibits favorable control accuracy.

In a state in which the first valve housing 10 and the second valve housing 11 are connected and fixed to each other, the first valve chamber 20 communicated with the Ps port 13 and the second valve chamber 30 communicated with the second Pc port 15 are partitioned by the second land portion 51b of the rod 51, and therefore, the capacity control valve V can be simply configured.

Moreover, the rod 51 is biased rightward in the axial direction, i.e., toward the solenoid 80 side, by the coil spring 54, and therefore, the open state of the DC valve 53 can be reliably held in the non-energization state of the capacity control valve V. Further, the rod 51 is configured such that the outer peripheral surface of the second land portion 51b and the guide surface 11b of the second valve housing 11 slide on each other, and therefore, movement of the rod 51 in the axial direction can be stabilized.

Further, the CS valve 50 includes the pressure-sensitive body 61 arranged in the pressure-sensitive chamber 60 formed with the first Pc port 14 and configured to bias the rod 51 rightward in the axial direction through the coil spring 54 and the CS valve seat 10a provided at the first valve housing 10. Thus, a structure in which the reactive force provided to the rod 51 through the coil spring 54 according to the suction pressure Ps of the first valve chamber 20 is increased/decreased is made, and controllability of the control pressure Pc is enhanced.

In addition, the coil spring 54 configured to provide the biasing force in the axial direction is arranged between the pressure-sensitive body 61 and the rod 51, and therefore, the coil spring 54 can deformably move in the axial direction in association with movement of the rod 51 in the axial direction. Thus, even if an axial deformable amount of the pressure-sensitive body 61 is small, the DC valve 53 can be reliably operated.

The embodiment of the present invention has been described above with reference to the drawings, but specific configurations are not limited to such an embodiment. Even changes and additions made without departing from the gist of the present invention are included in the present invention.

Figure 9:
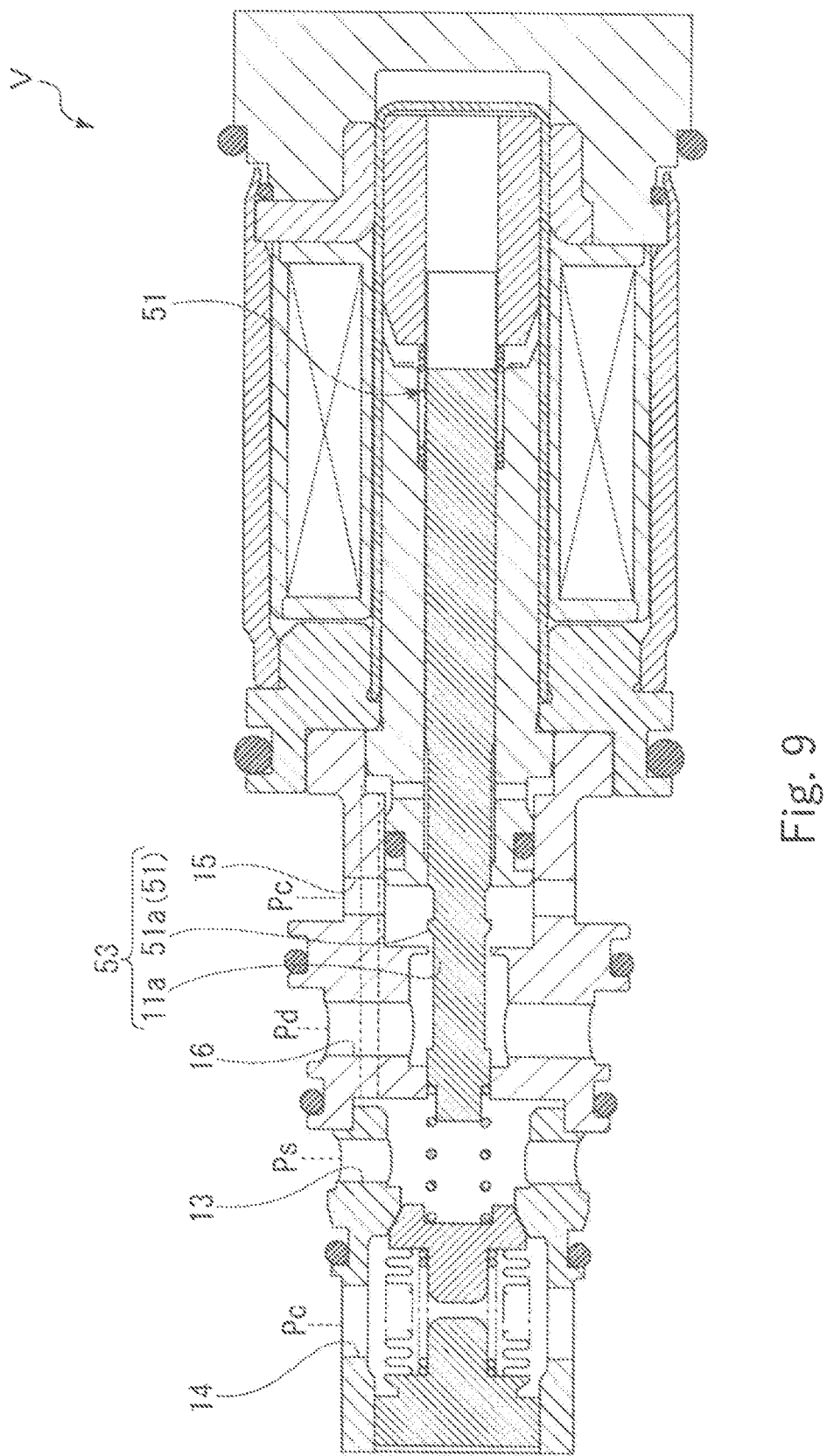
FIG. 9 is a sectional view illustrating a state in which a DC valve is opened and a CS valve is closed in a non-energization state of a capacity control valve of a variation.
Figure 10:
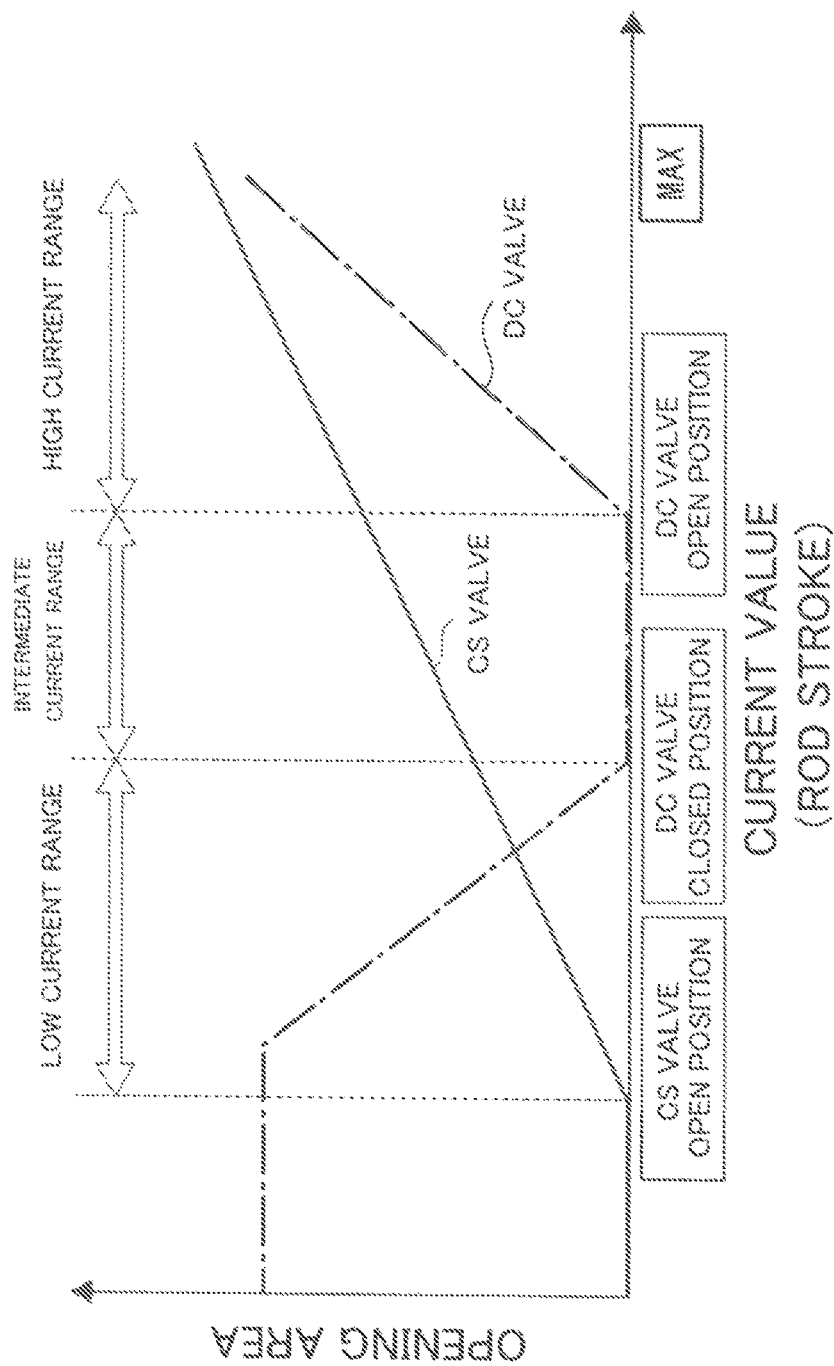
FIG. 10 is a graph for describing an opened/closed state of the DC valve and an opened/closed state of the CS valve in association with energization current (e.g., corresponding to a rod stroke) in the capacity control valve of the variation of FIG. 9. Note that the energization current (corresponding to the stroke) of the horizontal axis is shown in terms of the direction (i.e., a direction from the left to the right in FIG. 2) of moving a rod upon current application to a solenoid.

For example, the timing of opening/closing the DC valve 53 by the stroke of the rod 51 may be adjusted as necessary in such a manner that arrangement of the first land portion 51a in the axial direction at the rod 51, a formation position of the DC valve seat 11a in the axial direction at the second valve housing 11, or the length of the outer peripheral portion 51h of the first land portion 51a or the DC valve seat 11a in the axial direction is changed. For example, as illustrated in FIG. 9, a distance in the axial direction between the outer peripheral portion 51h of the first land portion 51a and the DC valve seat 11a may be longer than that in the above-described embodiment. With such a configuration of the variation, timing at which the DC valve 53 transitions from the open state to the closed state with the current value in the low current range, i.e., the timing of reducing the valve opening degree, can be delayed as compared to timing at which the CS valve 50 transitions from the closed state to the open state as illustrated in FIG. 10.

Moreover, the first land portion 51a and the second land portion 51b of the rod 51 may be configured in such a manner that rings as other bodies are fixed to the rod 51.

Further, the coil spring 54 is not limited to a compression spring, and may be a tension spring or may be in other shapes than a coil shape.

In addition, the coil spring 54 may be set to have a greater shrinkage allowance than those of the coil spring 85 of the solenoid 80 and the coil spring 63 of the pressure-sensitive body 61, and maximization of the degree of opening of the DC valve 53 is not necessarily restricted. Moreover, the left end 51f of the rod 51 in the axial direction may be set to have such a length in the axial direction that the left end 51f contacts the bottom surface of the recessed portion 70b of the adaptor 70 at, e.g., the timing of opening (fully opening) the CS valve 50, and accordingly, maximization of the degree of opening of the DC valve 53 may be restricted.

Further, the left end 51f of the rod 51 in the axial direction may directly contact, without arranging the coil spring 54, the recessed portion 70b of the adaptor 70 forming the pressure-sensitive body 61 to open/close the CS valve 50.

In addition, the first valve housing 10 and the second valve housing 11 may be integrally formed. Moreover, arrangement of the second Pc port 15 and the Pd port 16 formed at the second valve housing 11 may be reversed, and as illustrated in FIG. 9, each port may be formed in the order of the second Pc port 15, the Pd port 16, the Ps port 13, and the first Pc port 14 from the solenoid 80 side.

Further, the pressure-sensitive body 61 does not necessarily use the coil spring therein.

REFERENCE SIGNS LIST

1 Casing
2 Discharge chamber
3 Suction chamber
4 Control chamber
10 First valve housing (valve housing)
10a CS valve seat
11 Second valve housing (valve housing)
11a DC valve seat
11b Guide surface
12 Partition adjustment member
13 Ps port (suction port)
14 First Pc port (first control port)
15 Second Pc port (second control port)
16 Pd port (discharge port)
20 First valve chamber
30 Second valve chamber
40 Third valve chamber
50 CS valve
51 Rod
51a First land portion (land portion)
51b Second land portion 51c Large-diameter portion
51d First small-diameter portion
51e Second small-diameter portion
51f Left end in axial direction
51h Outer peripheral portion
51g Side portion
53 DC valve
54 Coil spring (spring)
60 Pressure-sensitive chamber
61 Pressure-sensitive body
62 Bellows core
63 Coil spring
70 Adaptor
70a Tapered end portion
70b Recessed portion
80 Solenoid
82 Stationary iron core
83 O-ring
84 Movable iron core
85 Coil spring
Pc Control pressure
Pd Discharge pressure
Ps Suction pressure
V Capacity control valve

The invention claimed is:

1. A capacity control valve for controlling a flow rate by energization of a solenoid, comprising:
a valve housing formed with a discharge port through which discharge fluid with a discharge pressure passes, a suction port through which suction fluid with a suction pressure passes, and first and second control ports through which control fluid with a control pressure passes;
a rod arranged in the valve housing and driven by the solenoid;
a CS valve configured to control a fluid flow between the first control port and the suction port in accordance with a movement of the rod; and
a DC valve configured to control a fluid flow between the second control port and the discharge port in accordance with the movement of the rod,
wherein in a non-energization state of the solenoid, the CS valve is closed and the DC valve is opened,
wherein as the energization of the solenoid becomes larger, the CS valve transitions from a closed state to an open state, and the DC valve is throttled from an open state and thereafter transitions to the open state, and
wherein in a maximum current state of the solenoid, the CS valve is opened and the DC valve is opened.

2. The capacity control valve according to claim 1, wherein
a state in which the DC valve is throttled in the energization of the solenoid is a closed state.

3. The capacity control valve according to claim 2, wherein
the DC valve has a spool valve structure, and includes a land portion of the rod and a DC valve seat provided at an inner periphery of the valve housing.

4. The capacity control valve according to claim 2, wherein
the rod is arranged at an inner periphery of the valve housing to partition the suction port and the discharge port.

5. The capacity control valve according to claim 2, wherein
the CS valve includes a pressure-sensitive body and a Cs valve seat, the pressure-sensitive body being arranged in a pressure-sensitive chamber formed with the first control port and configured to bias the rod, the CS valve seat being provided at the valve housing.

6. The capacity control valve according to claim 5, wherein
a spring configured to provide biasing force in an axial direction is arranged between the pressure-sensitive body and the rod.

7. The capacity control valve according to claim 2, wherein
the discharge port, the second control port, the suction port, and the first control port or the second control port, the discharge port, the suction port, and the first control port are arranged in description order from a side of the solenoid.

8. The capacity control valve according to claim 1, wherein
the DC valve has a spool valve structure, and includes a land portion of the rod and a DC valve seat provided at an inner periphery of the valve housing.

9. The capacity control valve according to claim 8, wherein
the rod is arranged at the inner periphery of the valve housing to partition the suction port and the discharge port.

10. The capacity control valve according to claim 8, wherein
the CS valve includes a pressure-sensitive body and a Cs valve seat, the pressure-sensitive body being arranged in a pressure-sensitive chamber formed with the first control port and configured to bias the rod, the CS valve seat being provided at the valve housing.

11. The capacity control valve according to claim 10, wherein
a spring configured to provide biasing force in an axial direction is arranged between the pressure-sensitive body and the rod.

12. The capacity control valve according to claim 8, wherein
the discharge port, the second control port, the suction port, and the first control port or the second control port, the discharge port, the suction port, and the first control port are arranged in description order from a side of the solenoid.

13. The capacity control valve according to claim 1, wherein
the rod is arranged at an inner periphery of the valve housing to partition the suction port and the discharge port.

14. The capacity control valve according to claim 13, wherein
the CS valve includes a pressure-sensitive body and a Cs valve seat, the pressure-sensitive body being arranged in a pressure-sensitive chamber formed with the first control port and configured to bias the rod, the CS valve seat being provided at the valve housing.

15. The capacity control valve according to claim 14, wherein
a spring configured to provide biasing force in an axial direction is arranged between the pressure-sensitive body and the rod.

16. The capacity control valve according to claim 13, wherein
the discharge port, the second control port, the suction port, and the first control port or the second control port, the discharge port, the suction port, and the first control port are arranged in description order from a side of the solenoid.

17. The capacity control valve according to claim 1, wherein the CS valve includes a pressure-sensitive body and a Cs valve seat, the pressure-sensitive body being arranged in a pressure-sensitive chamber formed with the first control port and configured to bias the rod, the CS valve seat being provided at the valve housing.

18. The capacity control valve according to claim 17, wherein a spring configured to provide biasing force in an axial direction is arranged between the pressure-sensitive body and the rod.

19. The capacity control valve according to claim 1, wherein the discharge port, the second control port, the suction port, and the first control port or the second control port, the discharge port, the suction port, and the first control port are arranged in description order from a side of the solenoid.

20. A capacity control valve for controlling a flow rate by energization of a solenoid, comprising:

a valve housing formed with a discharge port through which discharge fluid with a discharge pressure passes, a suction port through which suction fluid with a suction pressure passes, and first and second control ports through which control fluid with a control pressure passes;

a rod arranged in the valve housing so as to be driven by the solenoid, the rod forming a spool valve structure of a DC valve configured to control a fluid flow between the second control port and the discharge port by a land portion arranged at an outer periphery;

a pressure-sensitive body forming a CS valve configured to control a fluid flow between the first control port and the suction port in accordance with a movement of the rod, the pressure sensitive body including a bellows core fixed to the valve housing and an adapter fixed to a free end of the bellows core such that the adapter is separated from and faces toward a top end portion of the rod in an axial direction, and a spring having a first axial end attached to the top end portion of the rod and a second axial end attached to the adapter and to bias the rod and the adapter in opposite directions in which the rod and the adapter are separated from each other.

* * * * *